(12) United States Patent
Uyeki (10) Patent No.: US 10,279,697 B2
(45) Date of Patent: May 7, 2019

(54) SYSTEM AND METHOD FOR ESTIMATING A CHARGE LOAD

(71) Applicant: Robert Uyeki, Torrance, CA (US)

(72) Inventor: Robert Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 561 days.

(21) Appl. No.: 14/013,500

(22) Filed: Aug. 29, 2013

(65) Prior Publication Data
US 2015/0066224 A1 Mar. 5, 2015

(51) Int. Cl.
*G05D 17/02* (2006.01)
*B60L 11/18* (2006.01)
(Continued)

(52) U.S. Cl.
CPC ........... *B60L 11/1844* (2013.01); *B60L 53/60* (2019.02); *B60L 53/63* (2019.02); *B60L 53/65* (2019.02); *B60L 58/12* (2019.02); *G06Q 10/06314* (2013.01); *G06Q 50/06* (2013.01); *H02J 7/007* (2013.01); *H02J 7/0027* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
CPC ...... G06F 1/26; H02J 7/0054; H04W 52/0264
USPC ....... 320/104, 109, 124, 132, 103, 112, 114; 713/300
See application file for complete search history.

(56) References Cited

U.S. PATENT DOCUMENTS 7,949,435 B2 5/2011 Pollack et al.
8,143,842 B2 3/2012 Tyler et al.
(Continued)

FOREIGN PATENT DOCUMENTS

JP 2013150427 A 8/2013
WO 2013009178 A2 1/2013

OTHER PUBLICATIONS

EPO Extended Search Report for related application 14182863.2 dated Nov. 12, 2015; 9 pp.
(Continued)

*Primary Examiner* — Mohammad Ali
*Assistant Examiner* — Sheela Rao
(74) *Attorney, Agent, or Firm* — Armstrong Teasdale LLP (57) ABSTRACT

A computing device for estimating a charge load and a charge time for at least one electric vehicle is described. The computing device is configured to store, in a database coupled to the computing device, charging characteristics associated with a first vehicle of the at least one electric vehicle. The computing device is also configured to receive, from the first electric vehicle, a state of charge of the first electric vehicle, determine an estimated peak charge time and an estimated peak charge load based on the charging characteristics associated with the first electric vehicle and the state of charge of the first electric vehicle, and facilitate determining whether the first electric vehicle is authorized to charge based at least on the estimated peak charge time and the estimated peak charge load.

19 Claims, 10 Drawing Sheets

(51) Int. Cl.
*H02J 7/00* (2006.01)
*G06Q 50/06* (2012.01)
*G06Q 10/06* (2012.01)
*B60L 53/60* (2019.01)
*B60L 53/63* (2019.01)
*B60L 53/65* (2019.01)
*B60L 58/12* (2019.01)

(56) References Cited

U.S. PATENT DOCUMENTS

| | | | |
|---|---|---|---|
| 8,232,763 B1 | 7/2012 | Boot | |
| 8,232,765 B2 | 7/2012 | Billmaier | |
| 2010/0082277 A1 | 4/2010 | Ballard | |
| 2011/0172837 A1 | 7/2011 | Forbes, Jr. | |
| 2012/0210257 A1* | 8/2012 | Mosley | F01K 13/02 715/764 |
| 2012/0229089 A1 | 9/2012 | Bemmel et al. | |
| 2012/0233077 A1 | 9/2012 | Tate, Jr. et al. | |
| 2012/0245750 A1 | 9/2012 | Kumar et al. | |
| 2012/0253531 A1 | 10/2012 | Tyagi et al. | |
| 2012/0268245 A1* | 10/2012 | Alexander | B60L 3/12 340/5.82 |
| 2012/0319649 A1* | 12/2012 | Billmaier | H02J 3/02 320/109 |
| 2013/0006677 A1 | 1/2013 | Anglin et al. | |
| 2013/0009607 A1* | 1/2013 | Nishibayashi | B60L 11/1844 320/162 |
| 2013/0030581 A1 | 1/2013 | Luke et al. | |
| 2013/0046411 A1 | 2/2013 | Al Faruque et al. | |
| 2013/0175974 A1* | 7/2013 | Bassham | B60L 11/1837 320/106 |
| 2013/0311794 A1* | 11/2013 | Stewart | G06F 1/26 713/300 |
| 2014/0217976 A1* | 8/2014 | McGrath | B60L 11/1837 320/109 |
| 2014/0266004 A1* | 9/2014 | Andrews, Jr. | B60L 11/005 320/104 |

OTHER PUBLICATIONS

Office Action issued in Japanese Patent Application No. 2014-174444, dated Jul. 3, 2018, 6 pages, and unofficial English translation thereof.

EP Communication issued in connection with European Patent Application No. 14182863.2-1927, dated Dec. 11, 2017, 6 pages.

* cited by examiner

SYSTEM AND METHOD FOR ESTIMATING A CHARGE LOAD

BACKGROUND

The field of the disclosure relates generally to vehicles, and more particularly, to systems and methods for providing a utility with an estimated charge load associated with one or more electric vehicles.

At least some utilities that generate and distribute electricity through an electric grid attempt to balance the electrical demand (load) on the grid throughout the day. Accordingly, some utilities offer time of use (TOU) rates with peak rates and off-peak rates to encourage electricity users to shift their demand for electricity to off-peak hours. Additionally, some utilities utilize demand response (DR) signals to turn off electricity-consuming devices, such as home air conditioning devices, during peak hours.

With continuing sales of electric vehicles, such as battery electric vehicles (BEV) and plug-in hybrid electric vehicles (PHEV), the loads associated with such electric vehicles on the electric grid continue to increase. Given that electric vehicles are mobile and vary in their charging characteristics, managing the associated loads on the electric grid may be more difficult than for loads from stationary devices. Accordingly, it would be helpful for electric utilities to have accurate vehicle charge load and time estimations to better balance loads on the electric grid.

BRIEF DESCRIPTION

In one aspect, a computing device for estimating a charge load and a charge time for at least one electric vehicle is provided. The computing device is configured to store, in a database coupled to the computing device, charging characteristics associated with a first electric vehicle of the at least one electric vehicle. The computing device is also configured to receive, from the first electric vehicle, a state of charge of the first electric vehicle, determine an estimated peak charge time and an estimated peak charge load based on the charging characteristics associated with the first electric vehicle and the state of charge of the first electric vehicle, and facilitate determining whether the first electric vehicle is authorized to charge based at least on the estimated peak charge time and the estimated peak charge load.

In another aspect, a method for estimating a charge load and a charge time for at least one electric vehicle is provided. The method includes storing in a database coupled to a computing device, charging characteristics associated with a first electric vehicle of the at least one electric vehicle. The method additionally includes receiving, by the computing device, from the first electric vehicle, a state of charge of the first electric vehicle. Additionally, the method includes determining, by the computing device, an estimated peak charge time and an estimated peak charge load based on the charging characteristics associated with the first electric vehicle and the state of charge of the first electric vehicle. Additionally, the method includes facilitating, by the computing device, a determinations of whether the first electric vehicle is authorized to charge based at least on the estimated peak charge time and the estimated peak charge load.

In another aspect, a computer-readable storage device is provided. The computer-readable storage device has processor-executable instructions embodied thereon, for estimating a charge load and a charge time for at least one electric vehicle. When executed by a computing device communicatively coupled to a database, the processor-executable instructions cause the computing device to store, in the database, charging characteristics associated with a first electric vehicle of the at least one electric vehicle and receive, from the first electric vehicle, a state of charge of the first electric vehicle. Additionally, the instructions cause the computing device to determine an estimated peak charge time and an estimated peak charge load based on the charging characteristics associated with the first electric vehicle and the state of charge of the first electric vehicle. Additionally, the instructions cause the computing device to facilitate determining whether the first electric vehicle is authorized to charge based at least on the estimated peak charge time and the estimated peak charge load.

DETAILED DESCRIPTION

Implementations of methods and systems described herein facilitate providing, to a utility, data pertaining to loads and time periods (i.e., start times and stop times) of the loads associated with charging electric vehicles. Implementations of systems and methods described herein may generate, retrieve, and store data in a database of vehicle charging characteristics. For example, for each of multiple electric vehicles, the database may include a vehicle identification, a battery energy capacity (e.g., 20 kWh), a charger power capacity (e.g., 3.3 KW, 6.6 kW, 19.2 kW). In some implementations, a server system communicates with each electric vehicle to obtain a current location of each vehicle and a current state of charge ("SOC") of each vehicle.

Implementations of the system then generate an estimated load and time period of the load and transmit the information to the utility. In some embodiments, the system also determines a peak load and time period of the peak load ("peak charge time"). More specifically, as a battery in an electric vehicle charges up to, or around, 80% SOC, the charger draws more power from the utility than after the battery reaches 80% SOC, or around 80% SOC. When an electric vehicle communicates with the system, the system determines whether charge characteristics are stored in the database for the electric vehicle. The system may look up charge characteristics using the vehicle identification number ("VIN") of the vehicle, or may determine the charge characteristics through analyzing data pertaining to one or more charging sessions of the electric vehicle.

In one implementation, a computer program is provided, and the program is embodied on a computer-readable medium. In an example implementation, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
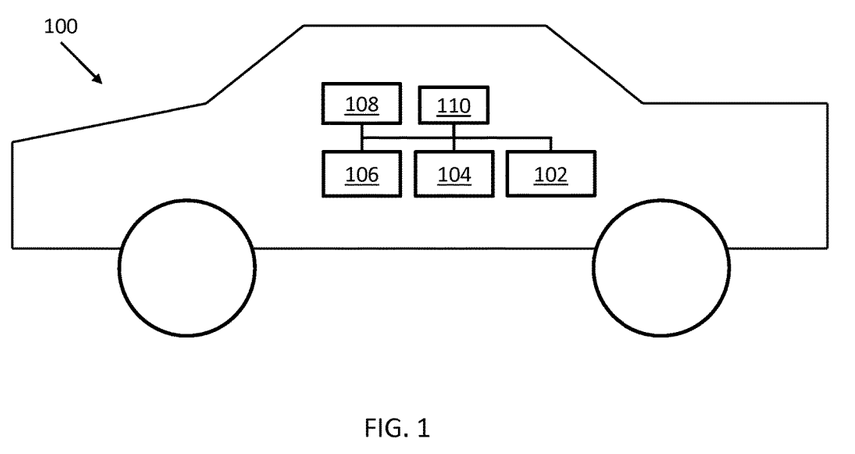
FIG. 1 is a diagram of an example electric vehicle in accordance with one aspect of the present disclosure.

FIG. 1 is a diagram of an example electric vehicle ("EV") 100. Electric vehicle 100 may be, for example, a battery electric vehicle ("BEV") or a plug-in hybrid electric vehicle ("PHEV"). Electric vehicle 100 includes a charger 102, a battery 104 coupled to charger 102, a global positioning system ("GPS") device 106, a computing device 108, and a telematics unit 110. Computing device 108 is coupled to telematics unit 110, GPS device 106, battery 104, and charger 102. Charger 102 has a power capacity of 3.3 kW. In other implementations, charger 102 has a different power capacity, for example 6.6 kW or 19.2 kW. Battery 104 has an energy capacity of, for example, 20 kWh. In other implementations, battery 104 has a different energy capacity. In some implementations, when the state of charge ("SOC") of battery 104 is below 80%, charger 102 provides a higher power output to battery 104 than when the SOC of battery 104 is at or above 80%. In other words, when the SOC is at or above 80%, charger 102 may operate in a "trickle charge" mode. Accordingly, a time period during which battery 104 is charging up to an 80% SOC may be referred to as a "peak charge time", and the associated energy amount required to reach an 80% SOC may be referred to as a "peak charge load." As used herein, a reference to a state of charge of an electric vehicle refers to the state of charge of the battery (e.g. battery 104) of the electric vehicle (e.g., electric vehicle 100). In contrast to a peak charge time and a peak charge load described above, the amount of energy required to charge up to 100% SOC and the associated amount of time required to reach the 100% may be referred to as a "total charge load" and a "total charge time".

GPS device 106 determines the location of vehicle 100 and, in some implementations, may operate with computing device 108 to provide navigation assistance to a driver (not shown) of electric vehicle 100. In some implementations, GPS device 106 and/or telematics unit 110 are integrated into computing device 108, rather than being physically separate from computing device 108. Telematics unit 110 transmits and receives data wirelessly with one or more remote computing devices. For example, telematics unit 110 may transmit the current location of electric vehicle 100, a current state of charge of battery 104, and an identification of electric vehicle 100 to a server system 302 (FIG. 3), as described in more detail herein.

Figure 2:
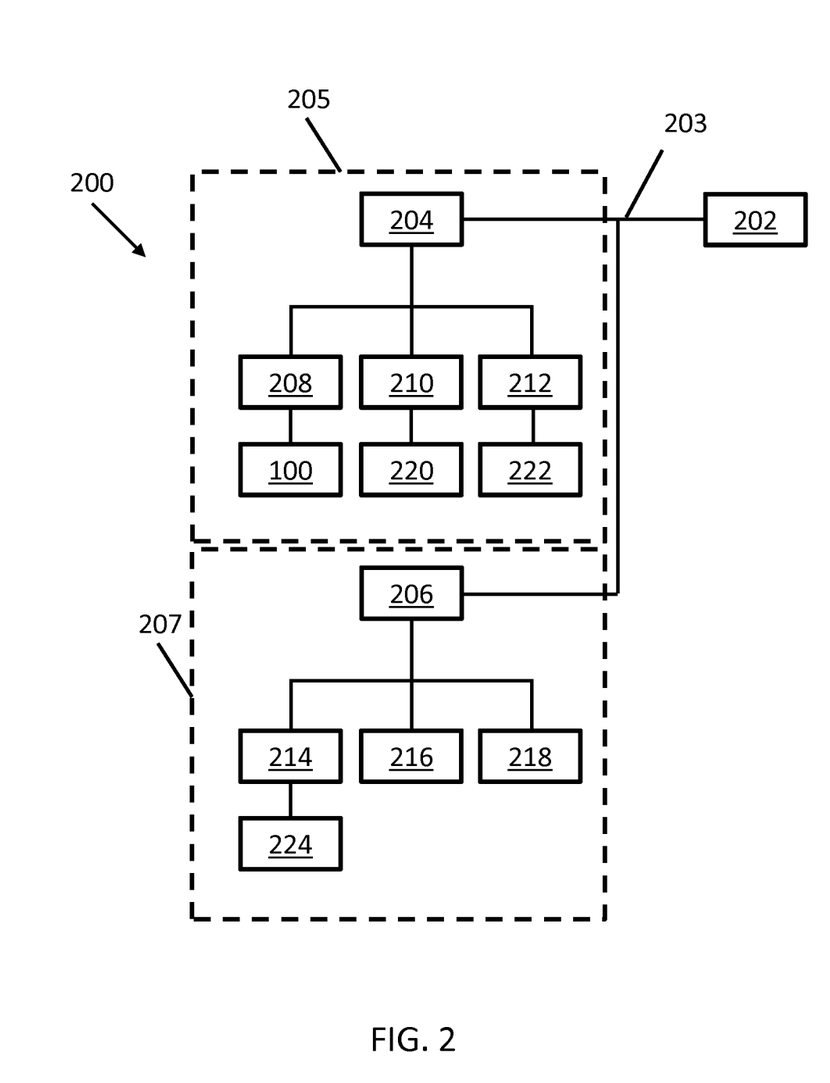
FIG. 2 is a diagram of an example environment including a utility, an electric grid, and the electric vehicle of FIG. 1 in accordance with one aspect of the present disclosure.

FIG. 2 is a diagram of an example environment 200 including a utility 202, an electric grid 203, and electric vehicle 100. More specifically, utility 202 is coupled to and transmits electricity through electric grid 203. A first transformer 204 that is associated with a first location 205 receives electricity transmitted from utility 202 and provides the electricity to a first charging station 208, a second charging station 210, and a third charging station 212. Electric vehicle 100 is coupled to and receives electricity from first charging station 212. A second electric vehicle 220 is coupled to and receives electricity from second charging station 210, and a third electric vehicle 222 is coupled to and receives electricity from third charging station 212. A second transformer 206 that is associated with a second location 207 receives electricity transmitted from utility 202 and provides the electricity to a fourth charging station 214. Second transformer 206 also makes the electricity available to a fifth charging station 216 and a sixth charging station 218. A fourth electric vehicle 224 is coupled to fourth charging station 214 and receives electricity therefrom.

Given that multiple electric vehicles 100, 220, and 222 are coupled to charging stations 208, 210, 212 in first location 205, the associated load on first transformer 204 and utility 202 may be greater than the load from second location 207. However, depending on the states of charge of electric vehicles 100, 220, 222, and 224, the load associated with location 205 may be equal to or less than the load associated with location 207. More specifically, electric vehicles 100, 220, and 222 may all have a SOC above 80% and therefore may be charging in a trickle charge mode while electric vehicle has a SOC below 80% and is drawing as much or more power from utility 202 than electric vehicles 100, 220, and 222.

During certain time periods throughout a day, a total electricity demand on utility 202 from locations 205, 207, and other locations may increase and decrease. For example, during the hours of 5:00 PM to 10:00 PM, the total electricity demand may be significantly higher than the demand during other hours. Likewise, demand on transformers 204 and 206 may change throughout the day, depending, at least in part, on the locations of electric vehicles 100, 220, 222, and 224, whether electric vehicles 100, 220, 222, and 224 are charging, and the states of charge of electric vehicles 100, 220, 222, and 224 (i.e., at or above 80% SOC).

Figure 3:
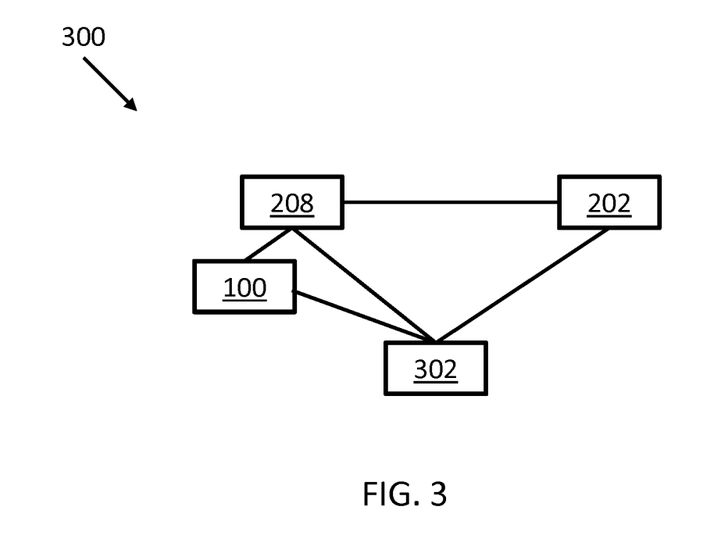
FIG. 3 is a diagram of an example system including the electric vehicle of FIG. 1, the utility of FIG. 2, a charging station, and a server system in accordance with one aspect of the present disclosure.
Figure 4:
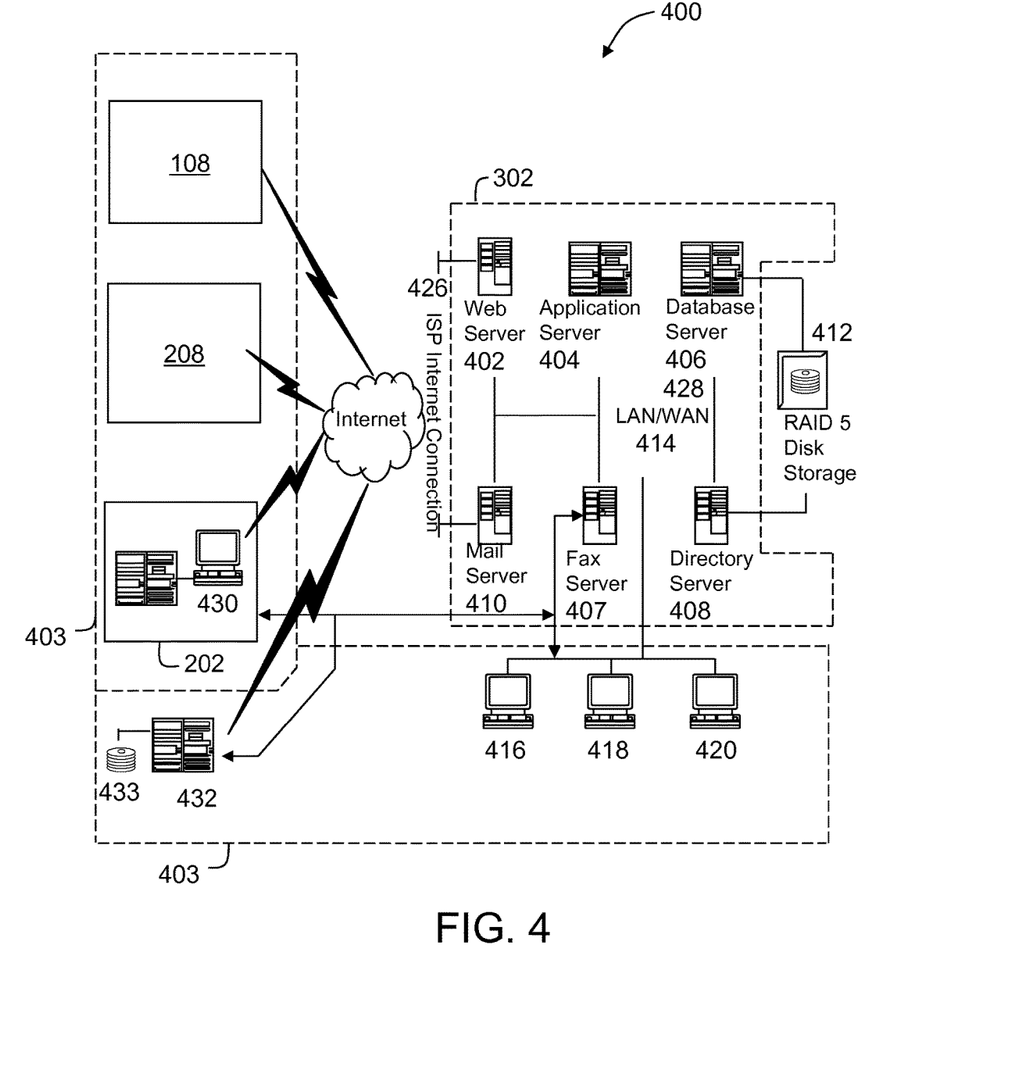
FIG. 4 is a block diagram of an example server architecture of the server system of FIG. 3, including a plurality of computing devices in accordance with one aspect of the present disclosure.

FIG. 3 is a diagram of an example system 300 including electric vehicle 100, utility 202, charging station 208, and a server system ("server computing device") 302. Server system 302 is in data communication with electric vehicle 100 and/or charging station 208, and utility 202. In addition to receiving electricity from utility 202, charging station 208 may be in data communication with utility 202. Server system 302 determines a location of electric vehicle 100, for example from a charging request transmitted by vehicle 100 or charging station 208, wherein the request includes an identification, such as a vehicle identification number ("VIN") or a hashed version of the VIN, and the current location of vehicle 100 or an identification of charging station 208. When an identification of charging station 208 is transmitted rather than the location of electric vehicle 100, server system 302 may determine the location of electric vehicle 100 by cross referencing the identification of charging station 208 with a location stored in a database 412 (FIG. 4). In other implementations, server system 302 receives the location of electric vehicle 100 from a periodic (e.g. every five seconds) data communication from electric vehicle 100. The charging request and/or periodic communication also includes the current SOC of electric vehicle 100.

By retrieving vehicle charging characteristics, for example the power capacity of charger 102 and the energy capacity of battery 104, from a database 412 (FIG. 4) coupled to server system 302, server system 302 determines an estimate of how much energy and time will be needed to charge electric vehicle 100 to 100% and how much energy and time will be required to charge electric vehicle to 80%. Server system 302 transmits the estimates and the location of electric vehicle 100 to utility 202 for use in determining whether electric vehicle 100 may charge, how long electric vehicle 100 may charge, and/or at what power level electric vehicle 100 may charge. In some implementations, server system 302 is located at utility 202 rather than being physically separate from utility 202. As described in more detail herein, server system 302 may also retrieve vehicle charging characteristics from an external or secondary database using, for example, the VIN of electric vehicle 100, or may determine and store the vehicle charging characteristics through analyzing data pertaining to one or more charging sessions of electric vehicle 100.

FIG. 4 is a block diagram of an example server architecture 400 of server system 302. Server architecture 400 includes server system 302 and client systems ("client computing devices") 403. Server system 302 includes a web server 402, an application server 404, a database server 406, a fax server 407, a directory server 408, and a mail server 410. A disk storage unit (database) 412 is coupled to database server 406 and directory server 408. Servers 402, 404, 406, 407, 408, and 410 are coupled in a local area network (LAN) 414. In addition, a system administrator's workstation 416, a user workstation 418, and a supervisor's workstation 420 are coupled to LAN 414. Alternatively, workstations 416, 418, and 420 are coupled to LAN 414 using an Internet link or are connected through an Intranet.

Each workstation, 416, 418, and 420, is a personal computer having a web browser. Although the functions performed at the workstations typically are illustrated as being performed at respective workstations 416, 418, and 420, such functions can be performed at one of many personal computers coupled to LAN 414. Workstations 416, 418, and 420 are illustrated as being associated with separate functions only to facilitate an understanding of the different types of functions that can be performed by individuals having access to LAN 414.

Server system 302 is configured to be communicatively coupled to various entities, including computing device 108 of electric vehicle 100, charging station 208, and a client computing device 430 of utility 202 using an Internet connection 426. In addition, a third-party computing device 432 coupled to an external database (i.e., a third-party database) 433 of vehicle specifications, including vehicle charging characteristics, is coupled to server system 202. The vehicle charging characteristics may include vehicle makes, vehicle models, battery energy capacities, charger power capacities, and vehicle identification numbers (VINs) or hashed versions thereof. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 428, local area network 414 could be used in place of WAN 428.

Figure 5:
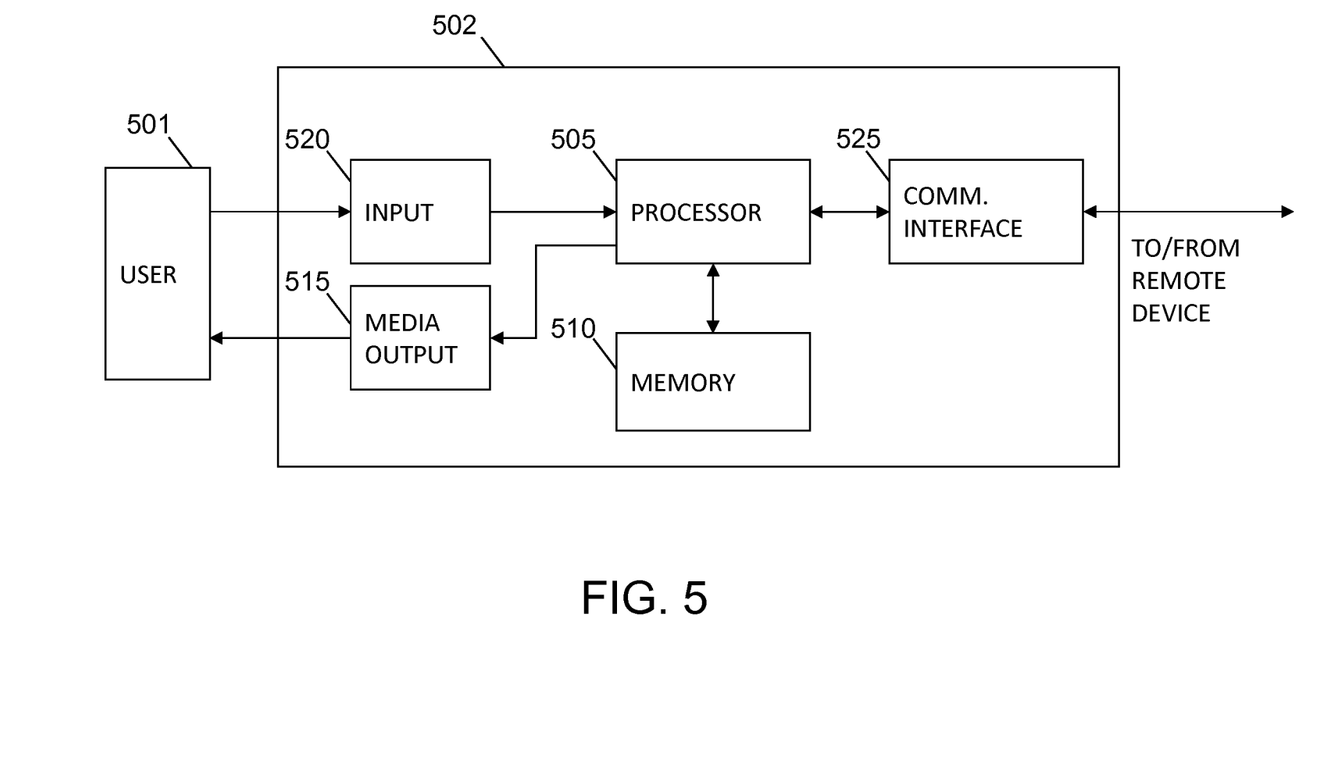
FIG. 5 is a block diagram of an example configuration of a client computing device of FIG. 4 in accordance with one aspect of the present disclosure.

FIG. 5 is a block diagram of an example configuration of a client computing device 502. Client computing device 502 may include, but is not limited to, computing device 108, charging stations 208, 210, 212, 214, 216, 218, and computing devices 416, 418, 420, 430, and 432.

Client computing device 502 includes a processor 505 for executing instructions. In some embodiments, executable instructions are stored in a memory area 510. Processor 505 may include one or more processing units (e.g., in a multi-core configuration). Memory area 510 is any device allowing information such as executable instructions and/or other data to be stored and retrieved. Memory area 510 may include one or more computer-readable media.

Client computing device 502 also includes at least one media output component 515 for presenting information to user 501. Media output component 515 is any component capable of conveying information to user 501. In some embodiments, media output component 515 includes an output adapter such as a video adapter and/or an audio adapter. An output adapter is operatively coupled to processor 505 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 502 includes an input device 520 for receiving input from user 501. Input device 520 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 515 and input device 520.

Client computing device 502 may also include a communication interface 525, which is communicatively couplable to a remote device such as server system 302. Communication interface 525 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)). With regard to electric vehicle 100 (FIG. 1), telematics unit 110 may be included in communication interface 525.

Stored in memory area 510 are, for example, computer-readable instructions for providing a user interface to user 501 via media output component 515 and, optionally, receiving and processing input from input device 520. A user interface may include, among other possibilities, a web browser and client application. Web browsers enable users, such as user 501, to display and interact with media and other information typically embedded on a web page or a website from server system 302. A client application allows user 501 to interact with a server application from server system 302.

Figure 6:
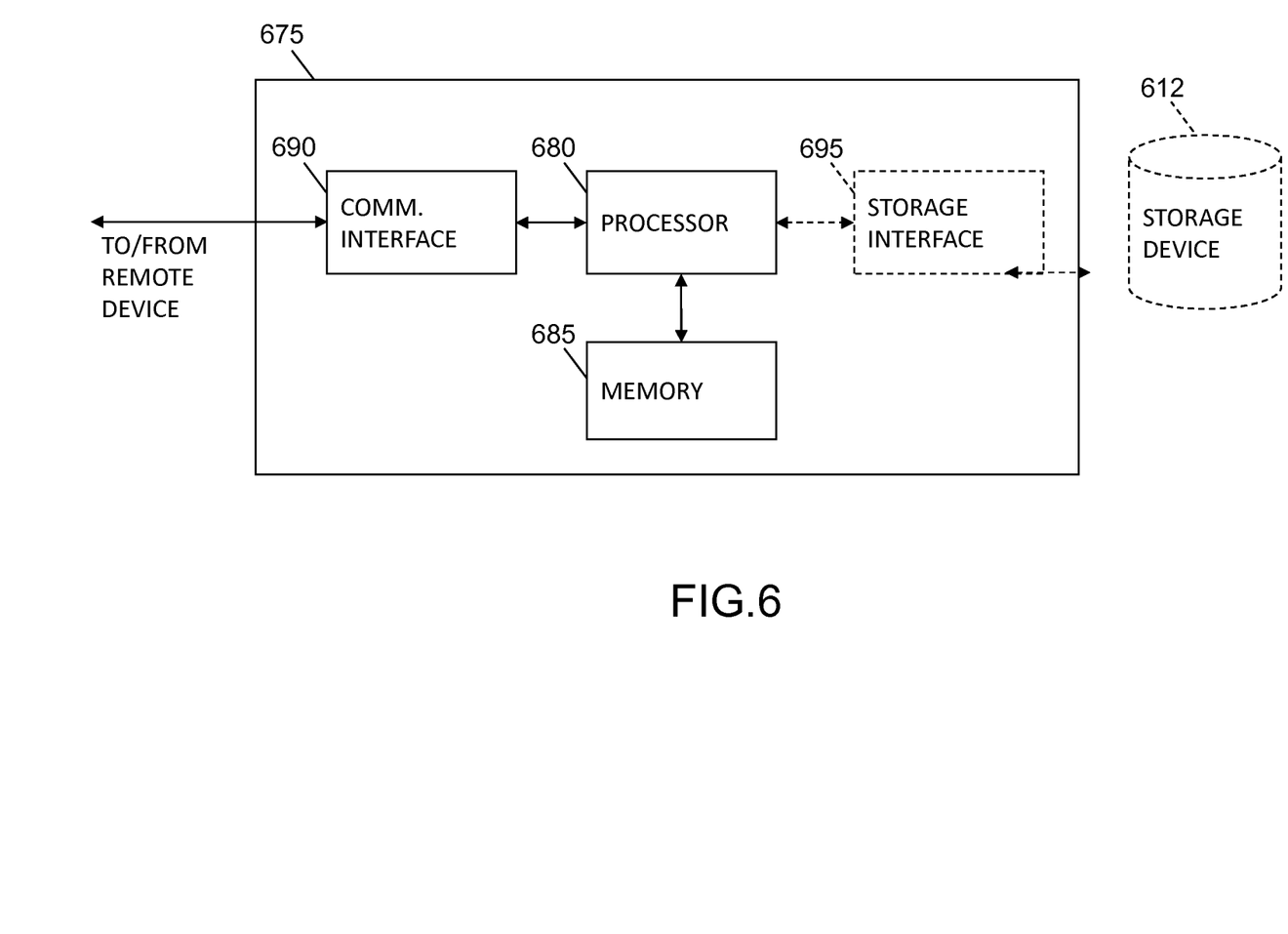
FIG. 6 is a block diagram of an example configuration of the server system shown in FIGS. 3 and 4 in accordance with one aspect of the present disclosure.

FIG. 6 is a block diagram of an example configuration of a server computing device 675 such as server system 302 (FIGS. 3 and 4). Server computing device 675 may include, but is not limited to, web server 402, application server 404, database server 406, fax server 407, directory server 408, and mail server 410.

Server computing device 675 includes a processor 680 for executing instructions. Instructions may be stored in a memory area 685, for example. Processor 680 may include one or more processing units (e.g., in a multi-core configuration).

Processor 680 is operatively coupled to a communication interface 690 such that server computing device 675 is capable of communicating with a remote device such as client computing device 502 or another server computing device 675. For example, communication interface 690 may receive requests from client systems 403 via the Internet, as illustrated FIG. 3.

Processor 680 may also be operatively coupled to a storage device 612. Storage device 612 is any computer-operated hardware suitable for storing and/or retrieving data. In some embodiments, storage device 612 is integrated in server computing device 675. For example, server computing device 675 may include one or more hard disk drives as storage device 612. In other embodiments, storage device 512 is external to server computing device 675 and may be accessed by a plurality of server computing devices 675. For example, storage device 612 may include multiple storage units such as hard disks or solid state disks in a redundant array of inexpensive disks (RAID) configuration. Storage device 612 may include a storage area network (SAN) and/or a network attached storage (NAS) system.

In some embodiments, processor 680 is operatively coupled to storage device 612 via a storage interface 695. Storage interface 695 is any component capable of providing processor 680 with access to storage device 612. Storage interface 695 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 680 with access to storage device 612.

Memory areas 510 and 685 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 7:
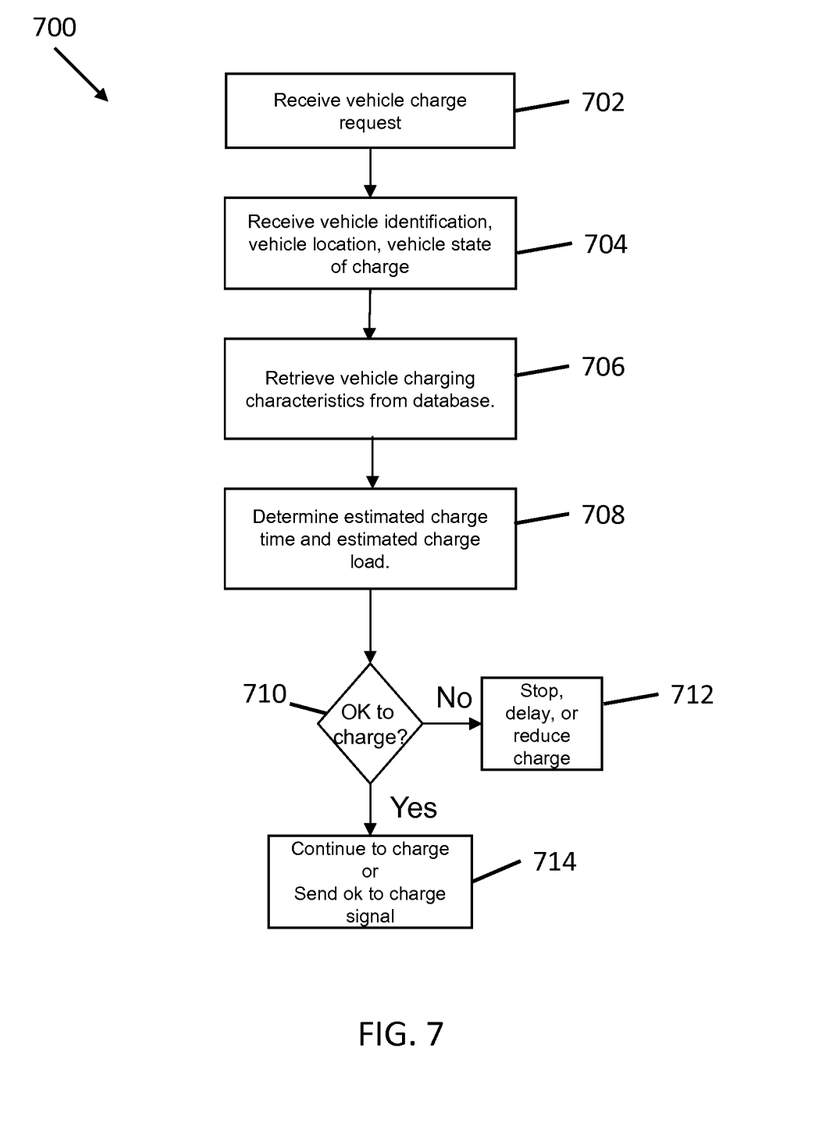
FIG. 7 is a flow chart of an example process for estimating a total charge time and a total charge load that may be implemented by the server system of FIG. 3 in accordance with one aspect of the present disclosure.

FIG. 7 is a flow chart of an example process 700 for estimating a total charge time and a total charge load that may be implemented by server system 302 (FIG. 3). Initially, server system 302 receives 702 a charge request associated with an electric vehicle, for example electric vehicle 100. In some implementations, the charge request is transmitted directly from electric vehicle 100 through telematics unit 110 to server system 302. In other implementations, the charge request is transmitted from a charging station to which electric vehicle 100 is coupled, for example charging station 208, to server system 302. Also, in some embodiments, the charge request is initially transmitted to utility 202, which in turn transmits the request or a portion thereof to server system 302.

Additionally, server system 302 receives 704 an identification of electric vehicle 100, an indication of the location of electric vehicle 100, and the current state of charge of electric vehicle 100. All or part of this information may be included in the charge request. In some implementations, the state of charge and/or the indication of the location of electric vehicle 100 may be transmitted to server system 302 separately from the charge request. For example, and as described above, electric vehicle 100 may transmit, through telematics unit 110, a periodic status update with the current location and state of charge of electric vehicle 100. In some implementations, the indication of the location of electric vehicle 100 is an identification of charging station 208, which server system 302 may use as an index to retrieve a geographic location from a database, for example database 412.

Additionally, server system 302 retrieves 706 vehicle charging characteristics from database 412. The vehicle charging characteristics include, for example, a power capacity of charger 102 and an energy capacity of battery 104. The charging characteristics may additionally include an indication of the state of charge at which battery 104 and charger 102 begin operating in a trickle charge mode. In some implementations, where such information is unavailable, server system 302 determines by default that the state of charge at which battery 104 and charger 102 begin operating in a trickle charge mode is 80%. Additionally, the charging characteristics may include the amount of power drawn by charger 102 during the trickle charge mode. Next, server system determines 708 an estimate of how much time will be required for electric vehicle to reach a 100% SOC ("total charge time") and how much energy will be required to reach a 100% SOC ("total charge load"), based at least on the current SOC of electric vehicle 100, the power capacity of charger 102, and the energy capacity of battery 104. In making the estimate, server system 302 may calculate the difference between the energy capacity of battery 104 and the current SOC, then divide by the power capacity of charger 102. Server system 302 may adjust the estimation by accounting for differing power levels drawn by charger 102 to charge battery 104 based on when (i.e., at what SOC) charger 102 and battery 104 switch from operating at the power capacity of charger 102 (i.e., peak load) to operating in a trickle charge mode (i.e., a reduced power mode).

Next, server system 302 facilitates 710 determining whether the charge request is authorized. More specifically, if server system 302 is separate from utility 202, server system 302 transmits the location of electric vehicle 100, the estimated total charge time, and the estimated total charge load to utility 202. In other implementations, server system 302 is part of utility 202 and determines based on the estimated total charge time, the estimate total charge load, the location of electric vehicle 100, and contemporaneous or predicted demands on utility 202 and/or transformer 204 whether, and at what power level, electric vehicle 100 may charge. If the charge request is not authorized, an instruction is transmitted 712 from utility 202 and/or server system 302 to charging station 208 and/or electric vehicle 100 to not charge, or to charge at a reduced power level. If, on the other hand, the charge request is authorized, an instruction is transmitted 714 from utility 202 and/or server system 302 to charging station 208 and/or electric vehicle 100 to proceed with charging.

Figure 8:
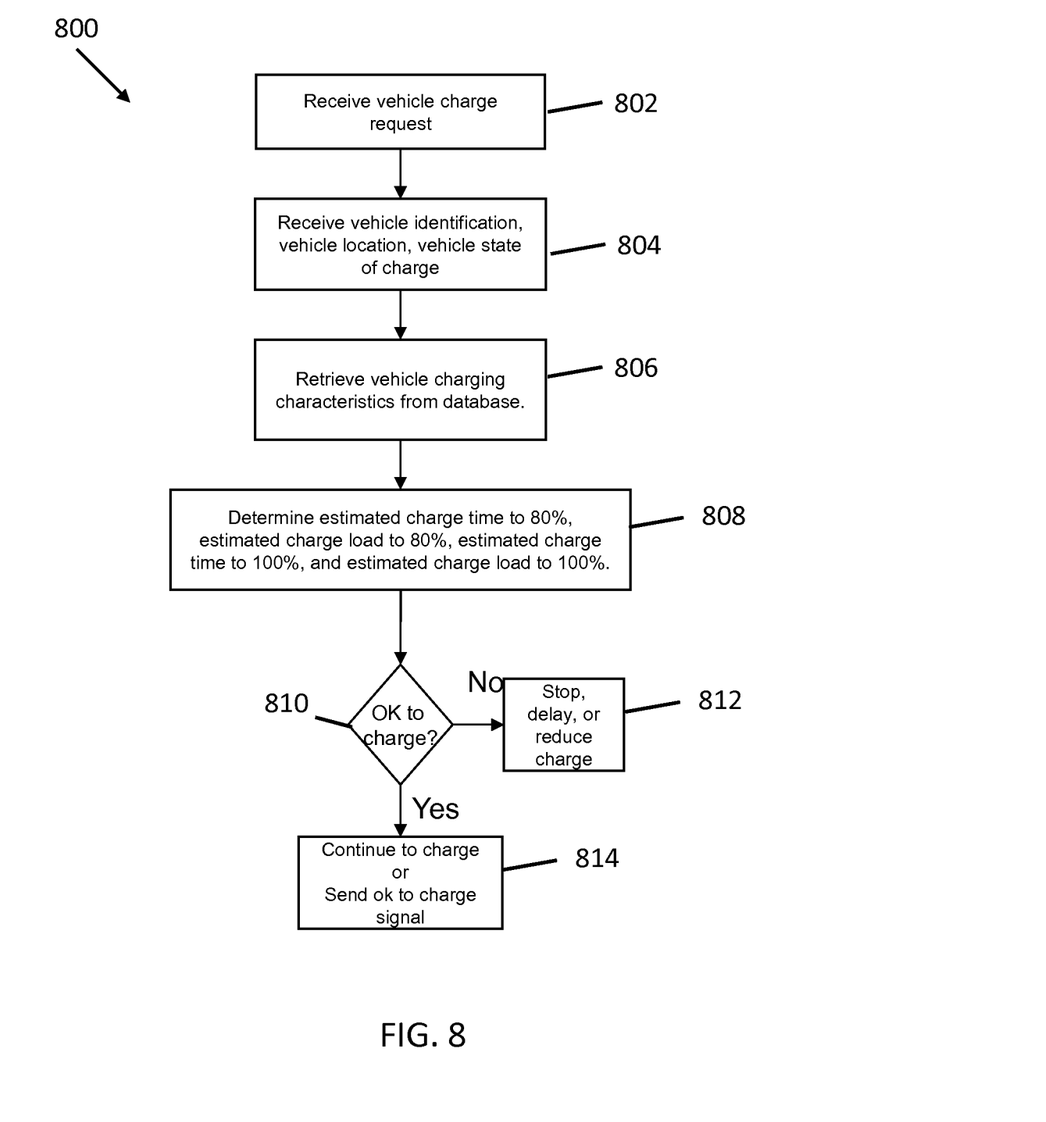
FIG. 8 is a flow chart of an example process for estimating a peak charge time and a peak charge load that may be implemented by the server system of FIG. 3 in accordance with one aspect of the present disclosure.

FIG. 8 is a flow chart of an example process 800 for estimating a peak charge time and a peak charge load that may be implemented by server system 302 (FIG. 3). Process 800 is similar to process 700. More specifically, steps 802, 804, 806, 810, 812, and 814 are similar to steps 702, 704, 706, 710, 712, and 714. Step 808 is also similar to step 708, however, in addition to estimating the total charge time and the total charge load, server system 302 additionally estimates a peak charge time and a peak charge load. More specifically, server system 302 determines how much energy is required ("peak charge load") for battery 104 to reach a state of charge at which battery 104 and charger 102 switch to a trickle charge mode, and additionally determines how much time is required ("peak charge time") to reach that state of charge. As described above, server system 302 may determine by default that the state of charge required to switch into a trickle charge mode is 80%, unless the vehicle charging characteristics stored in database 412 indicate a different state of charge. As described with reference to process 700, in implementations wherein server system 302 is separate from utility 202, server system 302 transmits the estimates and vehicle location to utility 202. Accordingly, in such implementations, server system 302 transmits the estimated peak charge load and estimated peak charge time to utility 202.

Figure 9:
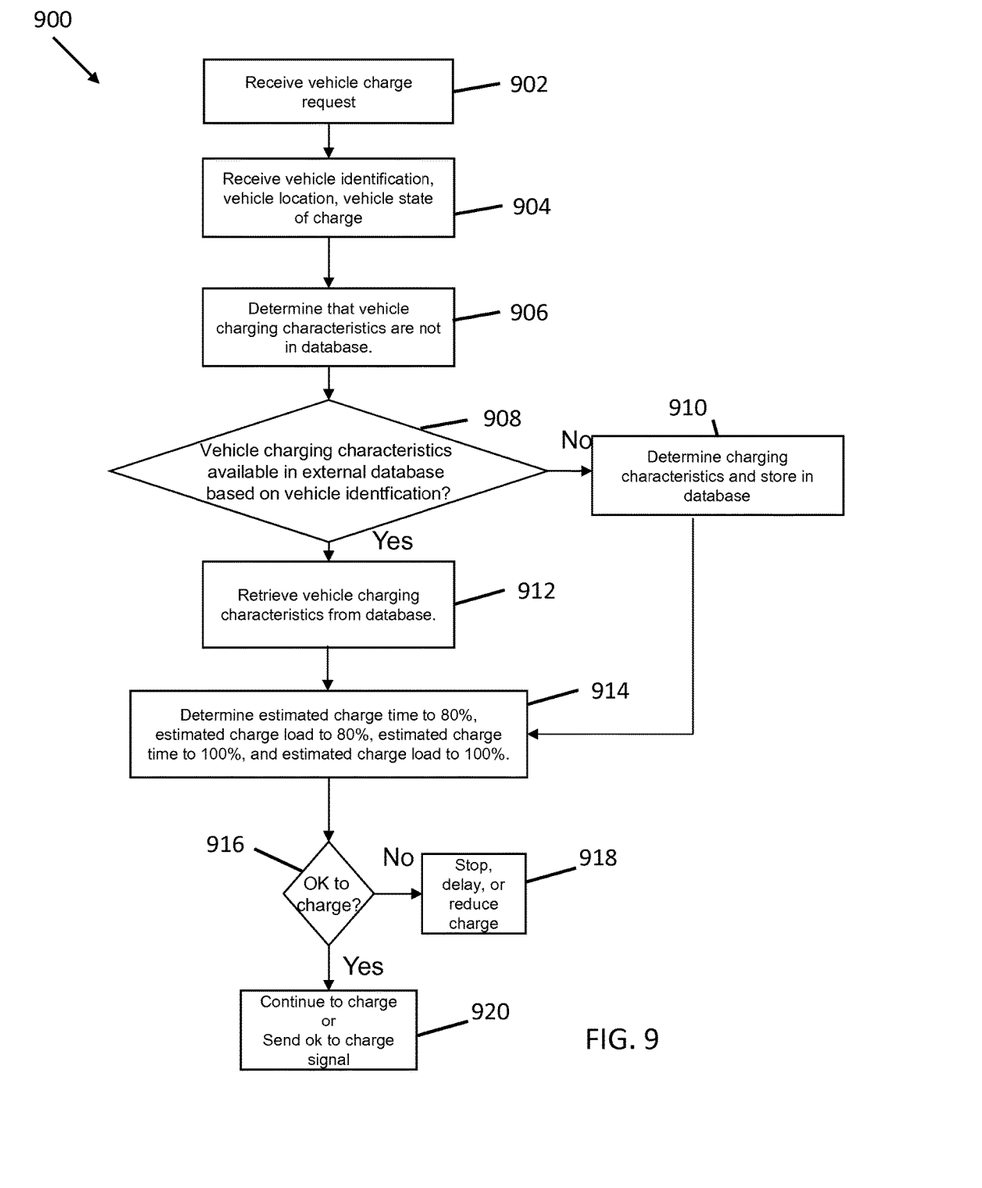
FIG. 9 is a flow chart of an example process that may be implemented by the server system of FIG. 3, for estimating a peak charge time and a peak charge load, and for determining charging characteristics of an electric vehicle in accordance with one aspect of the present disclosure.

FIG. 9 is a flow chart of an example process 900 that may be implemented by the server system 302 (FIG. 3), for estimating a peak charge time and a peak charge load, and for determining charging characteristics of electric vehicle 100. Process 900 is similar to process 800. More specifically, step 902 is similar to step 802, step 904 is similar to step 804, step 912 is similar to step 806, step 914 is similar to step 808, step 916 is similar to step 810, step 918 is similar to step 812, and step 920 is similar to step 814. After receiving 904 an identification of electric vehicle 100, an indication of the location of electric vehicle 100, and the current state of charge of electric vehicle 100, server system 302 determines 906 that charging characteristics for electric vehicle 100 are not in database 412. Next, server system 302 determines 908 whether charging characteristics are available in external database 433, for example by transmitting the received identification of electric vehicle 100 to third-party computing device 432 with a query for vehicle characteristics. The received identification may be, for example, the VIN of electric vehicle 100, or a hashed version thereof.

If server system 302 determines 908 that charging characteristics for electric vehicle 100 are not available in external database 433, for example by receiving a response from third-party computing device 432 that the charging characteristics are not available, then server system 302 determines 910 the charging characteristics of electric vehicle 100 and stores the charging characteristics in database 412. More specifically, server system 302 receives and stores information in database 412 during one or more charging sessions of electric vehicle 100 and determines, from a total energy consumed and changes in power consumption during one or more charging sessions, the energy capacity of battery 104, the power capacity of charger 102, and the state of charge at which charger 102 switches to a trickle charge mode (e.g., 80% SOC) and proceeds to step 914 described below. However, if charging characteristics for electric vehicle 100 are available in external database 423, then server system 302 retrieves 912 the charging characteristics. Next, server system determines 914 an estimated total charge time, an estimated total charge load, an estimated peak charge time, and an estimated peak charge load, as described with reference to step 808 of process 800. Next, server system proceeds to steps 916, 918, and 920, which are similar to corresponding steps 810, 812, and 814 as described above.

Figure 10:
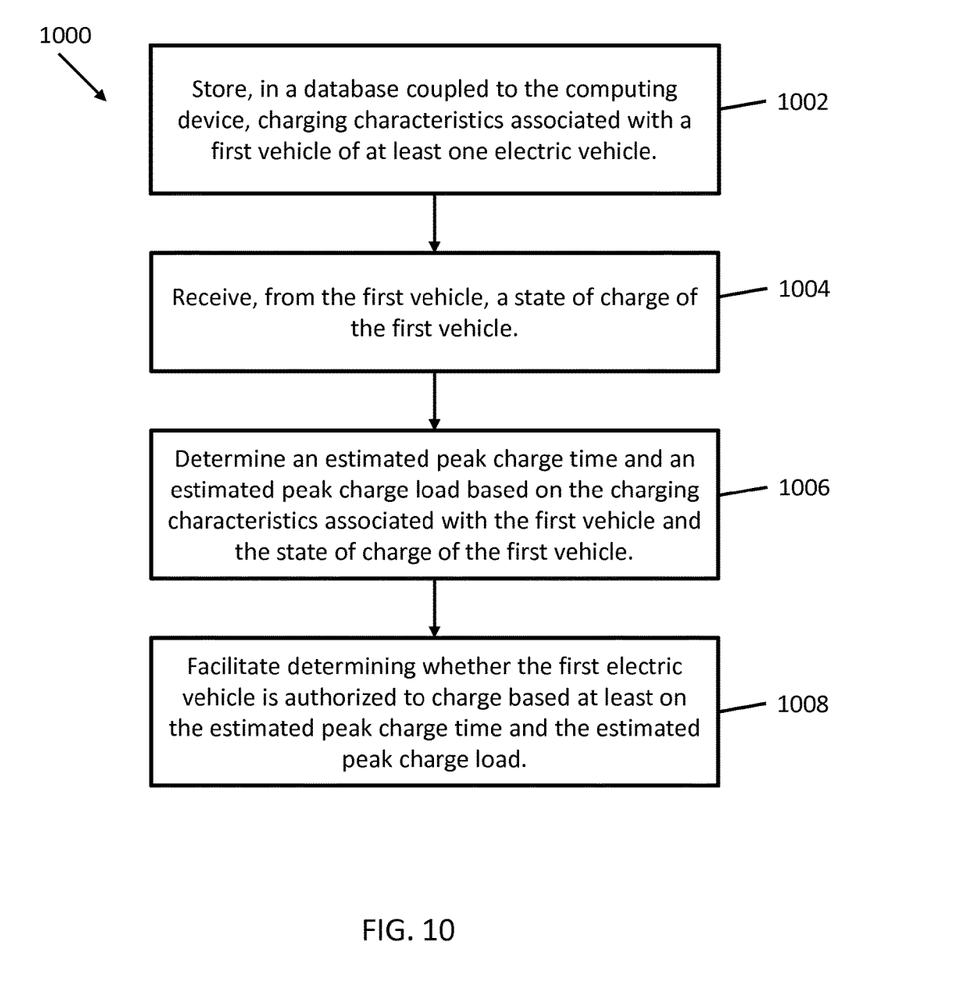
FIG. 10 is a flow chart of an example process that may be implemented by the server system of FIG. 3 in accordance with one aspect of the present disclosure.

FIG. 10 is a flow chart of an example process 1000 that may be implemented by a computing device, such as server system 302 (FIG. 3). Initially, server system 302 stores 1002 in a database (e.g., database 412) coupled to server system 302 charging characteristics associated with a first electric vehicle of at least one electric vehicle (e.g., electric vehicle 100). Next, server system 302 receives 1004, from electric vehicle 100, a state of charge of electric vehicle 100. Next, server system 302 determines 1006 an estimated peak charge time and an estimated peak charge load based on the charging characteristics associated with electric vehicle 100 and the state of charge of electric vehicle 100. Additionally, server system 302 facilitates 1008 determining whether electric vehicle 100 is authorized to charge based at least on the estimated peak charge time and the estimated peak charge load.

The methods and systems described herein may be implemented using computer programming or engineering techniques including computer software, firmware, hardware or any combination or subset thereof, wherein the technical effect may include at least one of: (a) storing, in a database coupled to a computing device, charging characteristics associated with a first electric vehicle of at least one electric vehicle; (b) receiving, from the first electric vehicle, a state of charge of the first electric vehicle; (c) determining an estimated peak charge time and an estimated peak charge load based on the charging characteristics associated with the first electric vehicle and the state of charge of the first electric vehicle; and (d) facilitating determining whether the first electric vehicle is authorized to charge based at least on the estimated peak charge time and the estimated peak charge load.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 505, 680, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

As compared to known systems and methods for facilitating charging electric vehicles, the systems and methods described herein provide a utility with estimates of charge times and charge loads associated with one or more electric vehicles to facilitate determining whether the one or more electric vehicles are authorized to charge. Accordingly, a utility provided with such estimates may more effectively balance demands on the power grid.

Exemplary embodiments of systems and methods for providing power to a vehicle accessory are described above in detail. The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing device for estimating a charge load and a charge time for at least one electric vehicle, said computing device configured to:
   store, in a first database coupled to said computing device, charging characteristics associated with the at least one electric vehicle;
   receive, from a first of the at least one electric vehicle, a state of charge of the first electric vehicle and a vehicle identification of the first electric vehicle;
   determine a location of the first electric vehicle;
   determine whether charging characteristics associated with the first electric vehicle are stored in the first database, the charging characteristics associated with the first electric vehicle including at least one of a vehicle make, a vehicle model, a battery energy capacity, and a charger power capacity of the first electric vehicle;
   query a second database using the vehicle identification to retrieve the charging characteristics associated with the first electric vehicle from the second database when the computing device determines that the charging characteristics associated with the first electric vehicle are not stored in the first database;
   determine an estimated peak charge time and an estimated peak charge load based on the charging characteristics associated with the first electric vehicle and the state of charge of the first electric vehicle;
   determine whether the first electric vehicle is authorized to charge based at least on the estimated peak charge time, the estimated peak charge load, the location of the first electric vehicle, and an energy demand on a transformer that provides electricity to a first charging station at the location of the first electric vehicle;
   instruct the first charging station to charge the first electric vehicle at a first power level, when the computing device determines that the first electric vehicle is authorized to charge; and
   one of (i) instruct the first charging station to charge the first electric vehicle at a second, reduced power level, and (ii) instruct the first charging station to not charge the first electric vehicle, when the computing device determines that the first electric vehicle is not authorized to charge.

2. The computing device of claim 1, wherein said computing device is configured to:
   estimate a total charge time; and
   estimate a total charge load.

3. The computing device of claim 2, wherein said computing device is configured to estimate the total charge time based at least in part on whether the first electric vehicle has a state of charge of at least 80 percent.

4. The computing device of claim 1, wherein said computing device is configured to store the charging characteristics associated with the first electric vehicle by storing the at least one of the vehicle make, the vehicle model, the battery energy capacity, and charger power capacity.

5. The computing device of claim 1, wherein said computing device is configured to receive the location of the first electric vehicle.

6. The computing device of claim 1, wherein said computing device is configured to receive a charge request associated with the first electric vehicle.

7. The computing device of claim 1, wherein the vehicle identification includes a vehicle identification number (VIN) associated with the first electric vehicle.

8. The computing device of claim 1, wherein said computing device is configured to determine the charging characteristics of the first electric vehicle by monitoring a power consumption of a charger of the first electric vehicle when the first electric vehicle is charging.

9. The computing device of claim 8, wherein said computing device is configured to determine a capacity of the battery by detecting a reduction in power consumption of the first electric vehicle.

10. The computing device of claim 1, wherein said computing device is configured to transmit an instruction to the first electric vehicle to reduce a rate of charge.

11. The computing device of claim 1, wherein the vehicle identification includes a hash of a VIN associated with the first electric vehicle.

12. The computing device of claim 1, wherein the computing device is further configured to:
   store, in the first database, charging characteristics associated with a second electric vehicle of the at least one electric vehicle;
   receive, from the second electric vehicle, a state of charge of the second electric vehicle and a vehicle identification of the second electric vehicle;
   determine a location of the second electric vehicle, wherein the location of the second electric vehicle is a second charging station that receives electricity from the same transformer as the first charging station;

determine whether charging characteristics associated with the second electric vehicle are stored in the first database, the charging characteristics associated with the second electric vehicle including at least one of a vehicle make, a vehicle model, a battery energy capacity, and a charger power capacity of the second electric vehicle;

retrieve the charging characteristics associated with the second electric vehicle from the second database based on the vehicle identification of the second electric vehicle when the computing device determines that the charging characteristics associated with the second electric vehicle are not stored in the first database;

determine an estimated peak charge time and an estimated peak charge load based on the charging characteristics associated with the second electric vehicle and the state of charge of the second electric vehicle; and determine whether at least one of the first and second electric vehicles is authorized to charge based at least on the estimated peak charge time of the first and second electric vehicles, the estimated peak charge load of the first and second electric vehicles, the location of the first and second electric vehicles, and an energy demand on the transformer.

13. A method for estimating a charge load and a charge time for at least one electric vehicle, comprising:

storing in a first database coupled to a computing device, charging characteristics associated with the at least one electric vehicle;

receiving, by the computing device, from a first of the at least one electric vehicle, a state of charge of the first electric vehicle and a vehicle identification of the first electric vehicle;

determining a location of the first electric vehicle;

determining, by the computing device, whether charging characteristics associated with the first electric vehicle are stored in the first database, the charging characteristics associated with the first electric vehicle including at least one of a vehicle make, a vehicle model, a battery energy capacity, and a charger power capacity of the first electric vehicle;

querying a second database using the vehicle identification to retrieve, by the computing device, the charging characteristics associated with the first electric vehicle from the second database when the computing device determines that the charging characteristics associated with the first electric vehicle are not stored in the first database;

determining, by the computing device, an estimated peak charge time and an estimated peak charge load based on the charging characteristics associated with the first electric vehicle and the state of charge of the first electric vehicle;

determining, by the computing device, whether the first electric vehicle is authorized to charge based at least on the estimated peak charge time, the estimated peak charge load, the location of the first electric vehicle, and an energy demand on a transformer that provides electricity to a first charging station at the location of the first electric vehicle;

instructing the first charging station to charge the first electric vehicle at a first power level when the computing device determines the first electric vehicle is authorized to charge; and one of (i) instructing the first charging station to charge the first electric vehicle at a second, reduced power level, and (ii) instructing the first charging station to not charge the first electric vehicle, when the computing device determines the first electric vehicle is not authorized to charge.

14. The method of claim 13, further comprising:
estimating a total charge time; and
estimating a total charge load.

15. The method of claim 13, further comprising storing the charging characteristics associated with the first electric vehicle, the charging characteristics including the at least one of the vehicle make, the vehicle model, the battery energy capacity, and the charger power capacity.

16. The method of claim 13, wherein determining the location of the first electric vehicle comprises receiving the location of the first electric vehicle.

17. The method of claim 13, comprising receiving a charge request associated with the first electric vehicle.

18. The method of claim 13, wherein receiving the vehicle identification of the first electric vehicle comprises receiving a vehicle identification number (VIN) associated with the first electric vehicle.

19. A computer-readable storage device having processor-executable instructions embodied thereon, for estimating a charge load and a charge time for at least one electric vehicle, wherein when executed by a computing device communicatively coupled to a first database, the processor-executable instructions cause the computing device to:

store, in the first database, charging characteristics associated with the at least one electric vehicle;

receive, from a first of the at least one electric vehicle, a state of charge of the first electric vehicle and a vehicle identification of the first electric vehicle;

determine a location of the first electric vehicle;

determine whether charging characteristics associated with the first electric vehicle are stored in the first database, the charging characteristics associated with the first electric vehicle including at least one of a vehicle make, a vehicle model, a battery energy capacity, and a charger power capacity of the first electric vehicle;

query a second database using the vehicle identification to retrieve the charging characteristics associated with the first electric vehicle from the second database when the computing device determines that the charging characteristics associated with the first electric vehicle are not stored in the first database;

determine an estimated peak charge time and an estimated peak charge load based on the charging characteristics associated with the first electric vehicle and the state of charge of the first electric vehicle;

determine whether the first electric vehicle is authorized to charge based at least on the estimated peak charge time, the estimated peak charge load, the location of the first electric vehicle, and an energy demand on a transformer that provides electricity to a first charging station at the location of the first electric vehicle;

instruct the first charging station to charge the first electric vehicle at a first power level when the computing device determines the first electric vehicle is authorized to charge; and one of (i) instruct the first charging station to charge the first electric vehicle at a second, reduced power level, and (ii) instruct the first charging station to not charge the first electric vehicle, when the computing device determines the first electric vehicle is not authorized to charge.

* * * * *